Jan. 21, 1969   T. TROGDON ET AL   3,423,490
METHOD OF MANUFACTURING UNITARY FOAM RUBBER ARTICLES
Original Filed March 2, 1964   Sheet _1_ of 3
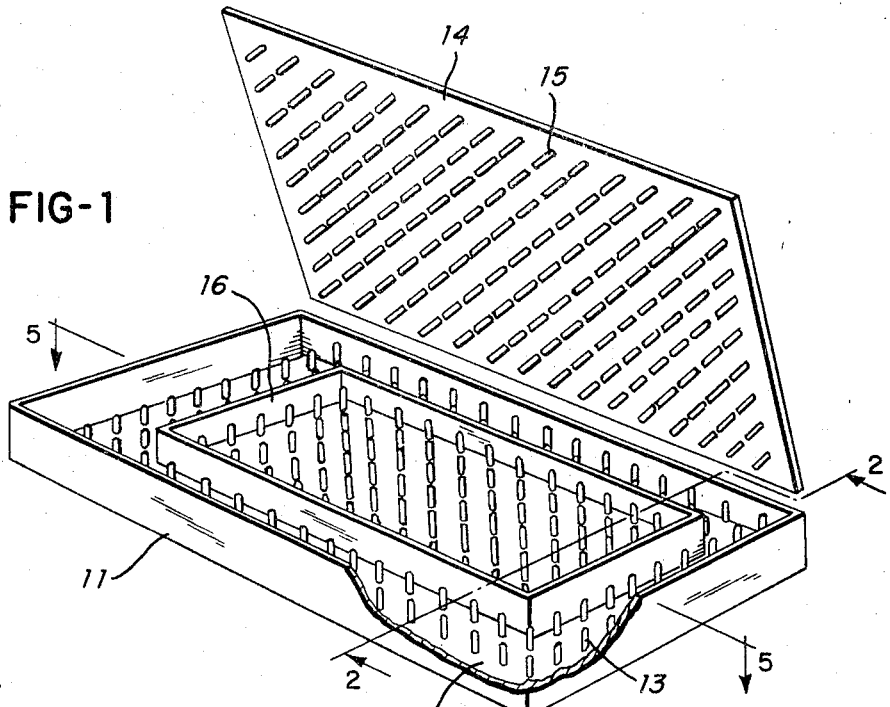
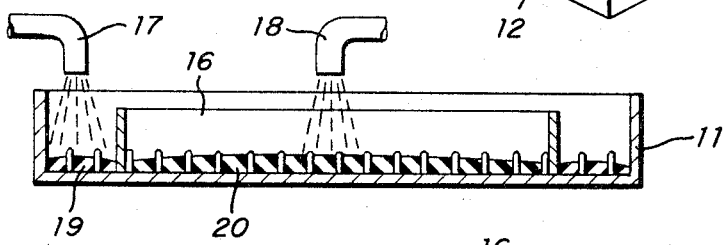
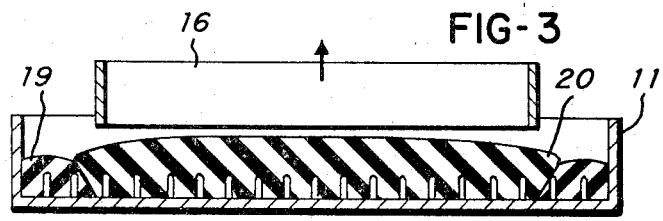
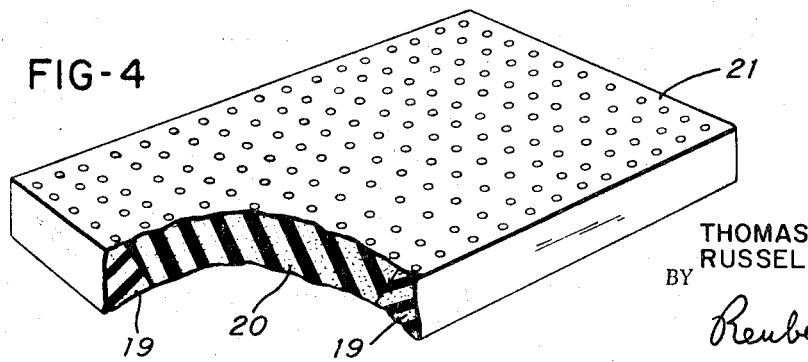
INVENTORS
THOMAS TROGDON
RUSSELL E. FULTZ
BY
Reuben Wolk
ATTORNEY Jan. 21, 1969     T. TROGDON ET AL     3,423,490
METHOD OF MANUFACTURING UNITARY FOAM RUBBER ARTICLES
Original Filed March 2, 1964     Sheet 2 of 3
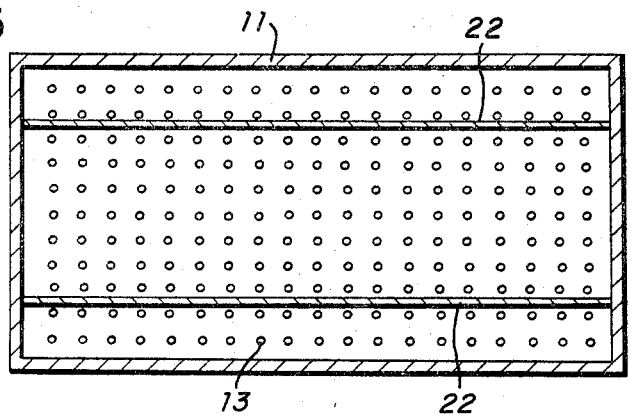
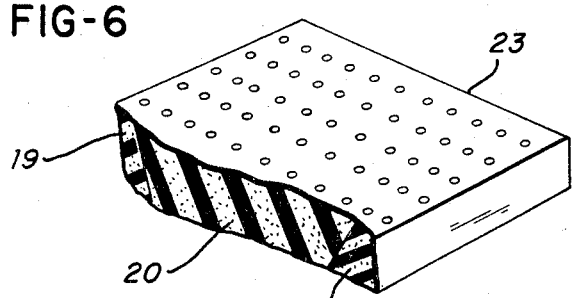
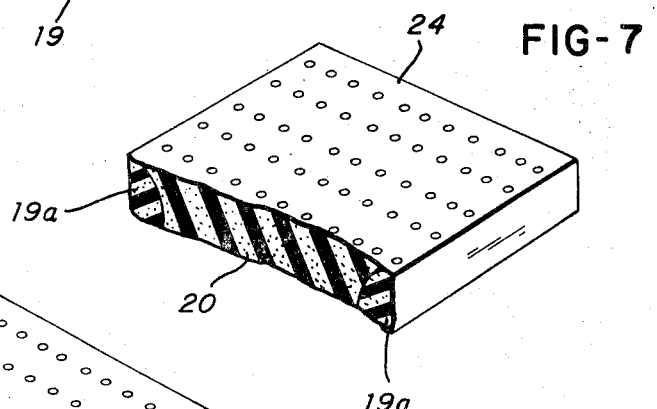
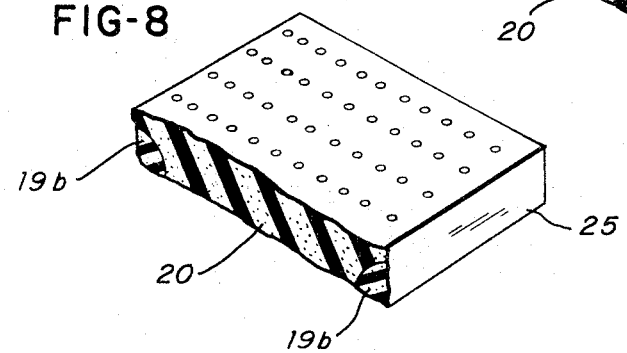
INVENTORS
THOMAS TROGDON
RUSSELL E. FULTZ
BY
Reuben Wolk
ATTORNEY

United States Patent Office 3,423,490
Patented Jan. 21, 1969

3,423,490
METHOD OF MANUFACTURING UNITARY FOAM RUBBER ARTICLES
Thomas Trogdon, Waynesville, and Russell E. Fultz, Lake Junaluska, N.C., assignors to Dayco Corporation, a corporation of Delaware
Original application Mar. 2, 1964, Ser. No. 348,413, now Patent No. 3,287,748, dated Nov. 29, 1966. Divided and this application Apr. 20, 1966, Ser. No. 559,359
U.S. Cl. 264—46                                4 Claims
Int. Cl. B29d 27/04; B29h 7/20; B29c 9/00

ABSTRACT OF THE DISCLOSURE

The method of manufacturing molded unitary foam rubber articles by placing barrier strips within the mold cavity to define separate sections. Foamable rubber latex of different densities is introduced into the sections defined by the barrier strip, and after the latices begin to foam, the barrier strip is removed.

---

This application is a division of United States application Ser. No. 348,413, filed Mar. 2, 1964, now Patent No. 3,287,748.

This invention relates to foam rubber products and methods of manufacturing the same, and more particularly to such articles as mattresses, pillows, furniture cushions, automobile seat cushions, and the like.

Products of the type described herein are conventionally manufactured by the use of metal molds having upper and lower mold members, the lower member having a cavity in which the mold is partially filled with liquid rubber latex that is foamable. The latex is subsequently foamed, coagulated, and vulcanized as more fully described in United States Patent No. 2,432,353. The mold cavity and upper mold member contain a number of core pins which project into the cavity so that the resultant product has a number of corings extending inwardly from both surfaces. At the present time the above process utilizes a uniform latex composition which provides a product that is uniform in density. It may be desirable, however, to provide a product which has dissimilar densities in various portions thereof and which may be manufactured in a single step. In addition, it is desirable to create maximum structural characteristics of such a product.

It is a primary object of this invention to provide a product which is unitary yet contains material of dissimilar densities.

It is a further object to provide such a product in which desired portions are provided with unique structural advantages.

It is another object to provide a method for manufacturing such products.

In practicing the present invention the basic process described in the above Patent No. 2,432,353 may be employed. However, applicants have conceived the idea of placing an impervious strip of material within the mold cavity to form a barrier strip, introducing latices of dissimilar densities into the portions of the cavity defined by this strip, allowing the latices to begin to foam, then removing the barrier strip. Because of the foamable nature of the material, the individual latices will foam within the respective portions of the cavity and will maintain their separate identities during the process. A line of demarcation between the latices is created by the barrier strip, but because of the viscosity of the latices, the line is maintained even after the strip is removed. Because of the dissimilar densities of the material the denser latex will rise more slowly, and as a result, the line of demarcation is not vertical to the bottom of the mold but it angled so that the width of the denser portion of the foam will change as the foam rises. The width of the denser foam section will therefore be greatest at the beginning, or bottom, of the mold and will decrease to a minimum at the top of the mold. Eventually, the mating edges of the dissimilar foam materials will be bonded to each other to form a unitary product. The invention will be more fully described in the description and accompanying drawings, in which:

FIGURE 1 is a perspective view of a typical mold illustrating a barrier strip in position.

FIGURE 2 is a sectional view taken along lines 2—2 of FIGURE 1.

FIGURE 3 is a view similar to FIGURE 2 illustrating a further step of the invention.

FIGURE 4 is a perspective view, partially broken, of a finished product manufactured in accordance with the present invention.

FIGURE 5 is a sectional view illustrating a modified form of the invention and taken along lines 5—5 of FIGURE 1.

FIGURE 6 is a perspective view of a finished product manufactured in accordance with the modified form of the invention.

FIGURE 7 is a view similar to FIGURE 6 illustrating a further modification of the invention.

FIGURE 8 is a view similar to FIGURES 6 and 7 illustrating still another modified form of the invention.

Figure 9:
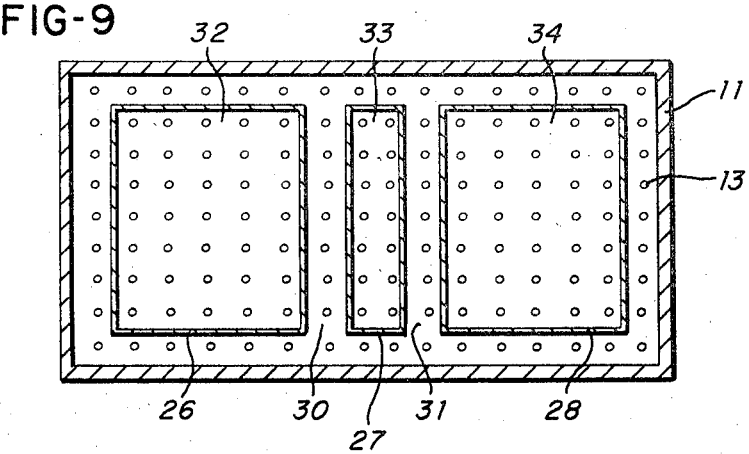
FIGURE 9 is a view similar to FIGURE 5 illustrating still another form of the invention.

Referring now to the drawings, FIGURE 1 illustrates a mold comprising upper and lower mold members. The lower mold member 11 has a mold cavity 12 in which is mounted a plurality of core pins 13. The upper mold member 14 also has core pins 15 mounted therein and is adapted to be closed on the mold half 11 in order to provide a completely enclosed mold during the manufacturing process. A barrier strip 16 is mounted in the mold cavity by placing it between adjacent rows of pins as illustrated, upon the bottom of the mold cavity; this strip is parallel to the outer periphery of the mold cavity and thus defines a separate outer peripheral portion of the cavity which is distinct from the remaining portion thereof. The strip is made of such conventional materials as wood, cardboard, or heavy paper; metals such as aluminum, steel, or magnesium; or plastic materials such as rigid polystyrene, polyethylene, polyvinyl chloride, or similar materials.

In order to fabricate the finished product, nozzles 17 and 18 are used to introduce liquid rubber latex into the portions of the mold as shown in FIGURE 2. The nozzle 17 will provide a latex 19 of one density, preferably about 0.35 gram per cubic centimeter, which results in a comparatively firm foam rubber product. This latex 19 is introduced into the outer peripheral portion of the mold, as defined by the barrier strip 16. The nozzle 18 is used to introduce liquid rubber latex 20 into the central or remaining portion of the mold cavity; this latex has a density of about 0.2 gram per cubic centimeter, and thus provides a foam rubber product which is somewhat softer than the other. The two latices are kept apart by the barrier strip 16 until the latices begin to foam and rise. It is of particular importance to note that as shown in FIGURE 3, there is a tendency for the denser latex 19 to rise at a slower rate than does the latex 20. At this point, almost as soon as the foam begins to rise, the barrier strip 16 is removed from the mold as shown in FIGURE 3.

The latices will continue to rise, however, and because of the above-mentioned different rate of foaming, the line of demarcation between the latices will be at an angle as shown in FIGURE 3 rather than vertical. The upper mold member 14 is closed at this point, and the foaming process will continue in a manner well known in the prior art, as described, for example, in the aforesaid Patent No. 2,432,353. The latices will foam into the stereoreticulate structure which is typical of this process, while maintaining distinct identities. The dissimilarity between the densities of the foam will prevent them from merging during the rising process, and at the same time the slower rate of rise of the latex 19 will maintain the line of demarcation at an angle as in FIGURE 3.

When the foaming process has been completed the resultant product will be a completely vulcanized foam rubber member. The cover is opened and the product is removed from the mold. The final product has the principal area on each surface composed of the less dense foam rubber, while the remaining area is of greated density. Because of the different rates of rise, however, the principal area of the upper surface is greater than the principal area of the lower surface. The resultant article is illustrated in FIGURE 4 and consists of a finished product 21, such as a mattress, having rectangular upper and lower surfaces and a uniform depth. The article 21 has a principal section 20 and a somewhat firmer outer peripheral portion 19 which acts as a stiffener. While there is no limitation as to the exact densities of these finished materials, a representative product will contain the outer peripheral foam segment having a density of about 0.09 gram per cubic centimeter, while the principal central portion has a density of about 0.06 gram per cubic centimeter. The peripheral segment has a maximum width at the lower surface and decreases in width as it extends upward, and in cross section, therefore, is trapezoidal. This section, which is highly important from a structural standpoint, provides a gradual increase in edge stiffening, as has been found by testing various designs of foam products such as mattresses. As the user places his weight on the mattress the entire edge is, of course, made firmer because of the denser peripheral material, and thus reduces any tendency of the sleeper to roll off and also minimizes any tendency of the edge of the mattress to break or lose its shape. While, of course, this stiffening effect is present without regard to the trapezoidal cross section just mentioned, it has been found that the structural advantage is inherent in this shape. When a user first lies upon the top of the mattress in which the narrower edge is present, the mattress is comparatively soft. As pressure increases, however, a gradual increase of strength is provided by the outer peripheral portion because of the fact that the thickness of this portion increases toward the bottom of the trapezoidal section. From the structural standpoint, it is highly desirable that increased stiffness be provided to meet increased weight and pressure.

It is not necessary, of course, that the foam product be limited to peripheral stiffening as described above, but other designs may be used. For example, only the longitudinal edges of the member may be stiffened and this may be done by utilizing a different type of barrier strip in the mold 11. As shown in FIGURE 5, two longitudinal strips 22, similar in composition to the strip 16, may be placed in the bottom of the mold parallel to the longitudinal sides thereof. The denser latex 19 is again poured into the mold at the edge portions, while the less dense latex 20 is introduced into the remaining central portion. The same process described above will take place, and a cross section of the mold during the foaming process would appear exactly as in FIGURE 3. In this case, however, the finished product is designated as in FIGURE 6 by reference numeral 23 and consists of the same denser latex 19 which in this case provides longitudinal edge strips rather than a peripheral segment.

The user will experience the structural advantages of the trapezoidal cross section with respect to the longitudinal edges.

It has been found that considerable variation in the height, depth, and width of the peripheral or edge areas may be controlled by changing the density of the latices. As a result, the stiffening area occupied by the denser foam may be varied. FIGURE 7 illustrates, for example, one variation of the stiffening area, whether applied to the member 21 having peripheral stiffening or to the member 23 having edge stiffening. By increasing the density of the stiffening latex, the rate of rise of this latex will be even slower. As shown in FIGURE 7, therefore, the latex now designated as 19a will rise so slowly that the less dense latex 20 will gradually be superimposed over the latex 19a as the latices rise. As a result, the plane of demarcation between the materials will be arcuate rather than straight-line and will provide a finished product 24. It has been found that such a relationship provides a different structural loading upon the stiffened area.

FIGURE 8 illustrates still another variation of the above principle in which latex 19b is still denser and, therefore, rises even slower. In this figure it can be seen that the less dense latex 20 has risen so fast that it completely covers the portion 19b at the upper surface of the finished product 25. This provides a product in which the upper surface has the same density of foam throughout, while the lower surface contains a reinforced periphery or longitudinal edges. The entire upper surface and the major area of the lower surface, therefore, have less dense foam, while the remaining area of the lower surface has denser foam.

While the above products have been described with reference to utilizing the product in the position shown, it should be understood that the product used as a mattress may be reversed so that the wider edge or peripheral portions (the wider segment of the trapezoid) are on the upper surface. This provides a member which has a wider reinforcement area along the edges or around the periphery.

Figure 10:
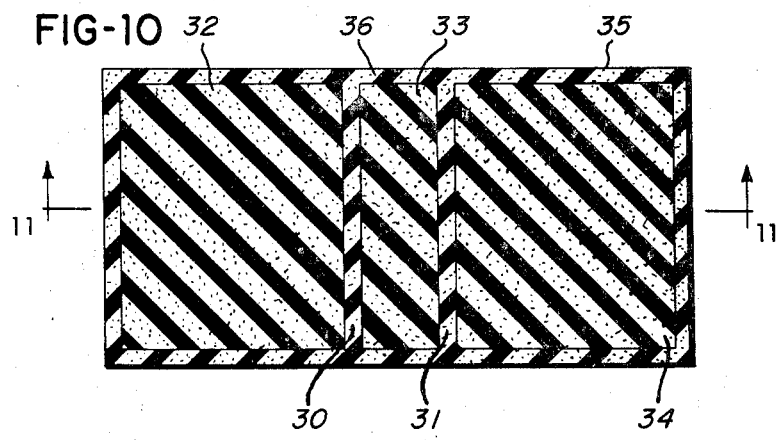
FIGURE 10 is a sectional view illustrating a product made in accordance with FIGURE 9.
Figure 11:
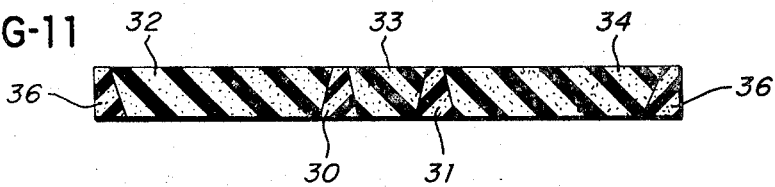
FIGURE 11 is a sectional view taken along the lines 11—11 of FIGURE 10.

Many other variations in shape are possible in practicing the present invention, depending upon the type of structural reinforcement which is desired. It is well known, of course, that certain portions of the body require more support than others when in a prone position, and, therefore, it may often be desirable to reinforce these portions of a mattress. For example, laterally reinforced areas might be placed in the mattress to correspond with the shoulders or hips of the user for support in these regions. This may be accomplished by using a different arrangement of barrier strips. As shown in FIGURE 9 the strips may consist of three separate rectangular segments 26, 27, and 28, which are placed in the mold in a manner similar to that previously described. The denser latex 19 is applied in the peripheral portion of the mold and is also placed between the barrier strips in the areas designated as 30 and 31. The less dense latex is placed within the openings 32, 33, and 34 created by the barrier strips. After the pouring, the barrier strips are removed as before and the process is allowed to continue. When the completed product 35 is removed from the mold it will appear as shown in FIGURES 10 and 11, in which the outer peripheral portion 36 will consist of comparatively dense foam, while the areas 30 and 31 will be of the same material and will, therefore, constitute lateral stiffening sections in the product. The remainder of the product will be formed of the less dense material as defined by the sections 32, 33, and 34. This product is, therefore, not only peripherally reinforced but contains the additional reinforcing sections required for supporting the heavy parts of the body.

It is, of course, obvious that other modifications are possible in the specific design of the product; for example, additional lateral or longitudinal structural segments may be created with the finished product by arbitrary location of the barrier strips. It should also be understood that the cross-sectional configuration of the peripheral and reinforcing segments of FIGURES 9, 10, and 11 need not be trapezoidal as shown, but may instead have the arcuate configurations of FIGURES 7 and 8.

Still other modifications of the invention are possible and fall within the scope of the invention. The basic concept of the invention, however, involves the use of the trapezoidal or similarly designed cross sections for creating structural effects within a foam rubber product. At the same time, dissimilar densities of foam material are used to enhance the structural effect. While the invention has been illustrated in the form of a mattress, it should be understood that the basic concept equally applies to furniture cushions, sleeping pillows, automobile seat cushions, and similar members. It should also be understood that the invention is not limited to a rectangular parallelpiped construction as shown, but may include articles of other shapes as well.

We claim:

1. The method of manufacturing molded unitary foam rubber articles in a mold cavity comprising the steps of placing barrier strips within said mold cavity to define sections separate from the principal portion of said cavity, introducing foamable rubber latex into said principal portion, introducing foamable rubber latex of a different density into said sections, allowing said latices to begin to foam, removing said strip, allowing said latices to complete foaming, and vulcanizing to produce a finished product.

2. The method of claim 1 in which said barrier strips are placed to define a peripheral section of said cavity.

3. The method of claim 1 in which said barrier strips are placed to define longitudinal edge sections of said cavity.

4. The method of claim 1 in which said barrier strips are placed to define transverse sections within said cavity.

References Cited

UNITED STATES PATENTS

| 929,938   | 8/1909  | Haldeman.              |
|-----------|---------|------------------------|
| 2,150,287 | 3/1939  | Minor _____ 264—46 |
| 2,432,353 | 12/1947 | Talalay _____ 264—54 XR |
| 3,287,748 | 11/1966 | Trogdon et al. ____ 264—54 XR |
| 3,320,339 | 5/1967  | Smith _____ 264—46 |

FOREIGN PATENTS

| 5,764   | 1/1932  | Australia.     |
|---------|---------|----------------|
| 763,733 | 12/1956 | Great Britain. |

JULIUS FROME, *Primary Examiner.*

PHILIP E. ANDERSON, *Assistant Examiner.*

U.S. Cl. X.R.

264—54, 245